US011052740B2

United States Patent
Pradeepkumar et al.

(10) Patent No.: US 11,052,740 B2
(45) Date of Patent: Jul. 6, 2021

(54) POWER SUPPLY DEVICE

(71) Applicant: FORD GLOBAL TECHNOLOGIES, LLC, Dearborn, MI (US)

(72) Inventors: Akash Changarankumarath Pradeepkumar, Westland, MI (US); Alfredo R. Munoz, Ann Arbor, MI (US); Michael W. Degner, Novi, MI (US); Edward Chan-Jiun Jih, Troy, MI (US); Guangyin Lei, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 524 days.

(21) Appl. No.: 16/000,531

(22) Filed: Jun. 5, 2018

(65) Prior Publication Data

US 2019/0366823 A1 Dec. 5, 2019

(51) Int. Cl.
| | |
|---|---|
| *B60L 53/20* | (2019.01) |
| *H02M 1/00* | (2006.01) |
| *H05K 7/14* | (2006.01) |
| *B60K 1/04* | (2019.01) |
| *H02M 7/537* | (2006.01) |
| *B60L 50/51* | (2019.01) |

(52) U.S. Cl.
CPC ............... *B60K 1/04* (2013.01); *B60L 50/51* (2019.02); *H02M 7/537* (2013.01); *B60K 2001/0416* (2013.01)

(58) Field of Classification Search
USPC ................................................ 307/10.1, 9.1
See application file for complete search history.

(56) References Cited

U.S. PATENT DOCUMENTS

| | | |
|---|---|---|
| 5,813,641 A | 9/1998 | Baldwin |
| 6,230,833 B1 | 5/2001 | Setsuda |
| 6,571,898 B2 | 6/2003 | Guyomard |
| 6,593,027 B1 | 7/2003 | Osterhart et al. |
| 6,892,796 B1 | 5/2005 | Nagashima et al. |
| 6,942,945 B2 | 9/2005 | Andersen et al. |
| 7,331,559 B2 | 2/2008 | Hirayu |
| 7,389,841 B2 | 6/2008 | Boville |
| 7,656,016 B2 | 2/2010 | Yoshimatsu et al. |
| 7,726,427 B2 | 6/2010 | Picavet |
| 8,225,969 B2 | 7/2012 | Quinn et al. |
| 2002/0079152 A1 | 6/2002 | Van Hout et al. |
| 2011/0013429 A1 | 1/2011 | Campbell et al. |
| 2014/0340847 A1 | 11/2014 | Iwakiri et al. |
| 2017/0040907 A1* | 2/2017 | Goto ....................... H02M 7/44 |

* cited by examiner

*Primary Examiner* — Rexford N Barnie
*Assistant Examiner* — Xuan Ly
(74) *Attorney, Agent, or Firm* — David B Kelley; Brooks Kushman P.C.

(57) ABSTRACT

An electric vehicle power supply includes a housing, a power supply, and a plurality of fasteners. The housing defines an internal cavity and has inwardly protruding tabs that extend into the cavity. The power assembly has a front cover and an end cover. The power assembly also has an array of electrical switching units arranged horizontally between the front and end covers. The front and end covers have outwardly protruding tabs. Each of the plurality of fasteners extend vertically, engage one inwardly protruding tab, and engage one outwardly protruding tab to secure the power assembly to the housing.

20 Claims, 5 Drawing Sheets

POWER SUPPLY DEVICE

TECHNICAL FIELD

The present disclosure relates to electric/hybrid vehicles and power supply devices for electric/hybrid vehicles.

BACKGROUND

Electric and hybrid vehicles may include power modules that are configured to convert DC electrical power from a traction battery into AC electrical power in order to supply AC electrical power to a motor that is configured to propel the vehicle.

SUMMARY

An electric vehicle power supply that is configured to convert DC electrical power into AC electrical power includes a housing, inwardly protruding tabs, a power assembly, outwardly protruding tabs, and a plurality of fasteners. The housing has walls that form a periphery about and define an internal cavity. The inwardly protruding tabs extend from the walls and into the cavity. The power assembly has a front cover and an end cover. The power assembly also has an array of electrical switching units that are secured to and arranged in a longitudinal direction between the front and end covers. The outwardly protruding tabs extend from each of the front and end covers. Each of the plurality of fasteners extend perpendicular to the longitudinal direction and engage one inwardly protruding tab and one outwardly protruding tab to secure the power assembly to the walls.

An electric vehicle power supply includes a housing, a power supply, and a plurality of fasteners. The housing defines an internal cavity and has inwardly protruding tabs that extend into the cavity. The power assembly has a front cover and an end cover. The power assembly also has an array of electrical switching units arranged horizontally between the front and end covers. The front and end covers have outwardly protruding tabs. Each of the plurality of fasteners extend vertically, engage one inwardly protruding tab, and engage one outwardly protruding tab to secure the power assembly to the housing.

A vehicle power supply includes a housing, an inverter assembly, and a plurality of fasteners. The housing has inwardly extending protrusions that define through holes. The inverter assembly is disposed in the housing and has an array of electrical switching units arranged horizontally between a front cover and an end cover. The front and end covers each have an outwardly extending protrusion that defines a tapped hole. Each of the plurality of fasteners extend vertically through one through hole and engage one tapped hole to secure the inverter assembly to the housing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
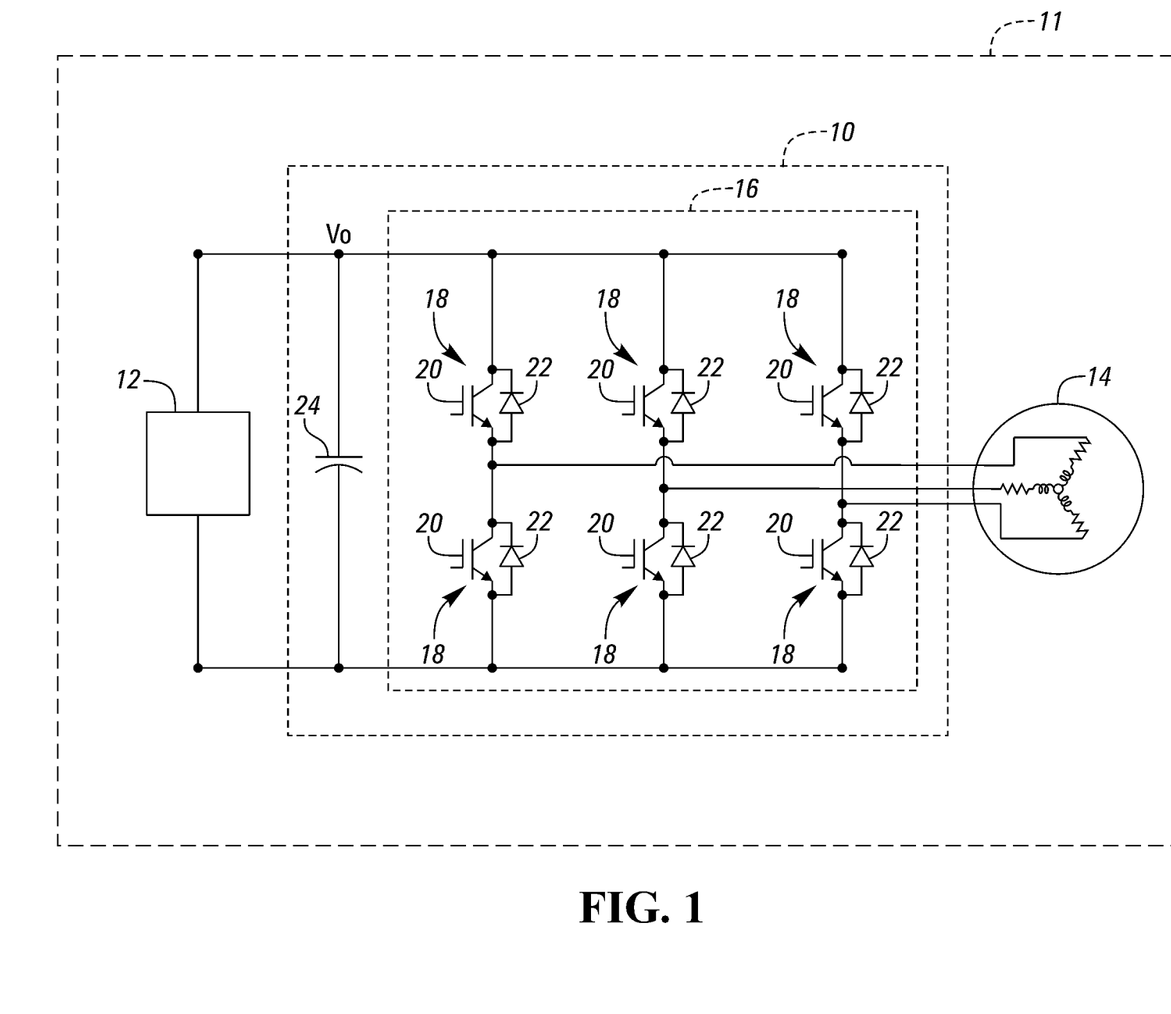
FIG. 1 is a circuit diagram illustrating a power supply device coupled to a power source and a load.

Referring to FIG. 1, a circuit diagram of a power supply device 10 coupled to a power source 12 and a load 14 is illustrated. The power supply device 10 is configured to convert direct (DC) electrical current into alternating (AC) electrical current. The power supply device 10 may be utilized in an electric drive system of a vehicle 11, such as an electric or hybrid vehicle. The power source 12 may be coupled to the power supply device 10 in order to drive the load 14. In some contexts, including the context of an electric or hybrid vehicle, the power source 12 may be a battery, such as a traction battery, and the load 14 may be an electric machine such as an electric motor or electric motor/generator. The power source 12 may further comprise a high voltage battery that is coupled to a voltage converter (not shown). The power supply device 10 may include a power assembly or power module 16. The power module 16 may be configured to deliver electrical power to the load 14. Furthermore, the power module 16 may be an inverter or inverter assembly, which is the subcomponent of the power supply device 10 that converts DC electrical current into AC electrical current.

The power module 16 includes inverting circuitry. The inverting circuitry may include switching units 18. The switching units 18 may each comprise a transistor 20, such as an insulated gate bipolar transistor (IGBT), in antiparallel with a diode 22. The switching units 18 may be configured to provide alternating current to the load 14. The power supply device 10 may include a linking capacitor 24. The linking capacitor 24 may be disposed between the power source 12 and the power module 16. The linking capacitor 24 may be configured to absorb ripple currents generated at the power module 16 or the power source 12, and stabilize the DC-link voltage, $V_o$, for power module 16 control. Stated in other terms, the linking capacitor 24 may be arranged to limit voltage variation at an input of inverting circuitry due to ripple currents generated by the inverting circuitry in the power module 16 or a battery, such as a traction battery, that may comprise the power source 12.

The disclosure should not be construed as limited to the circuit diagram in FIG. 1, but should include power supply devices that include other types power modules, inverters, capacitors, or combinations thereof. For example, the power module 16 may be an inverter that includes any number of switching units and not limited to the number of switching units depicted in FIG. 1. Alternatively, the linking capacitor 24 may be configured to couple one or a plurality of inverters to a power source.

Furthermore, it should be understood that the vehicle configuration described herein is merely exemplary and is not intended to be limited. Other electric or hybrid vehicle configurations that include other power sources, such as an internal combustion engine, should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
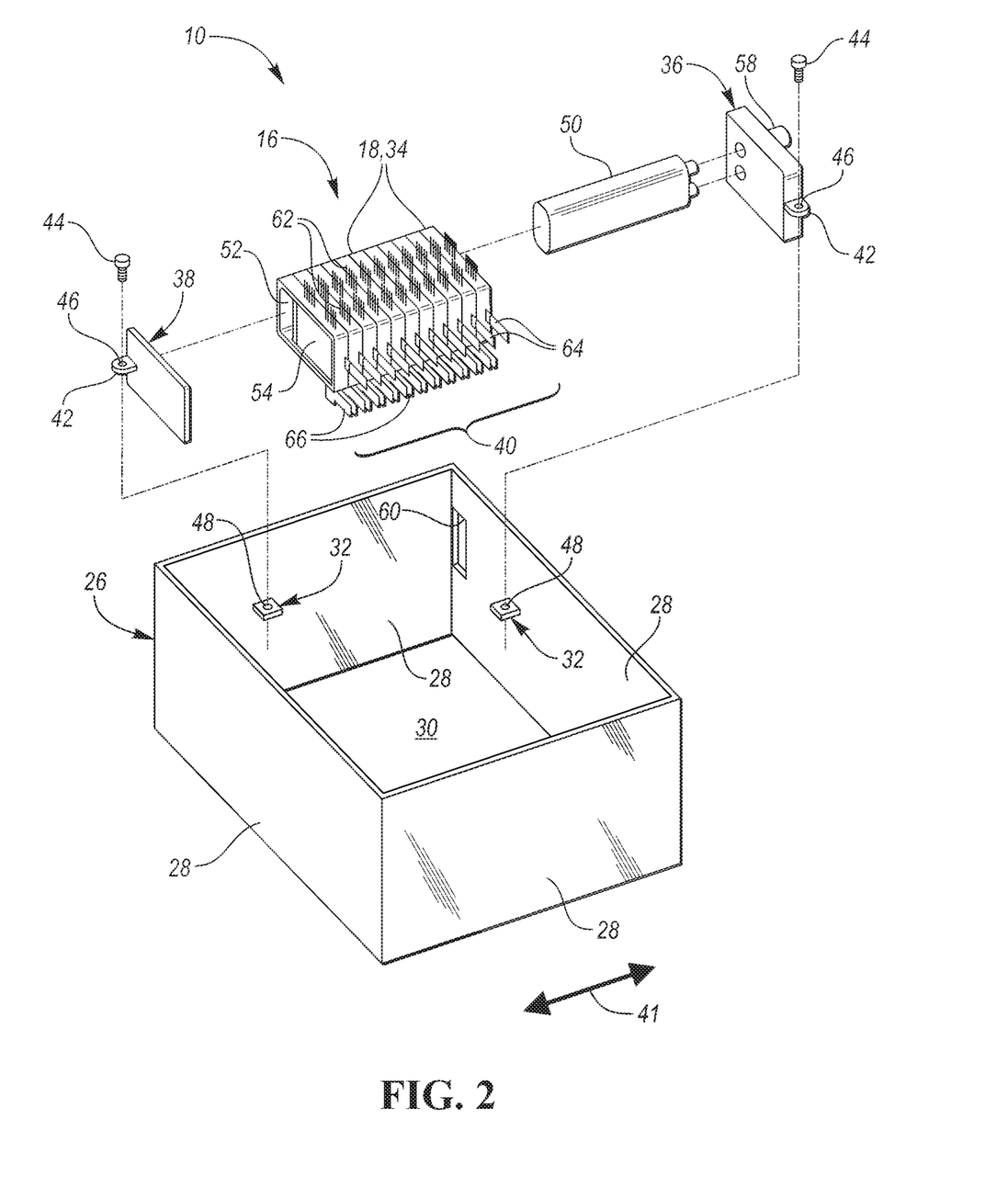
FIG. 2 is a bottom exploded isometric view of a first embodiment of a power supply device for an electric or hybrid vehicle.
Figure 3:
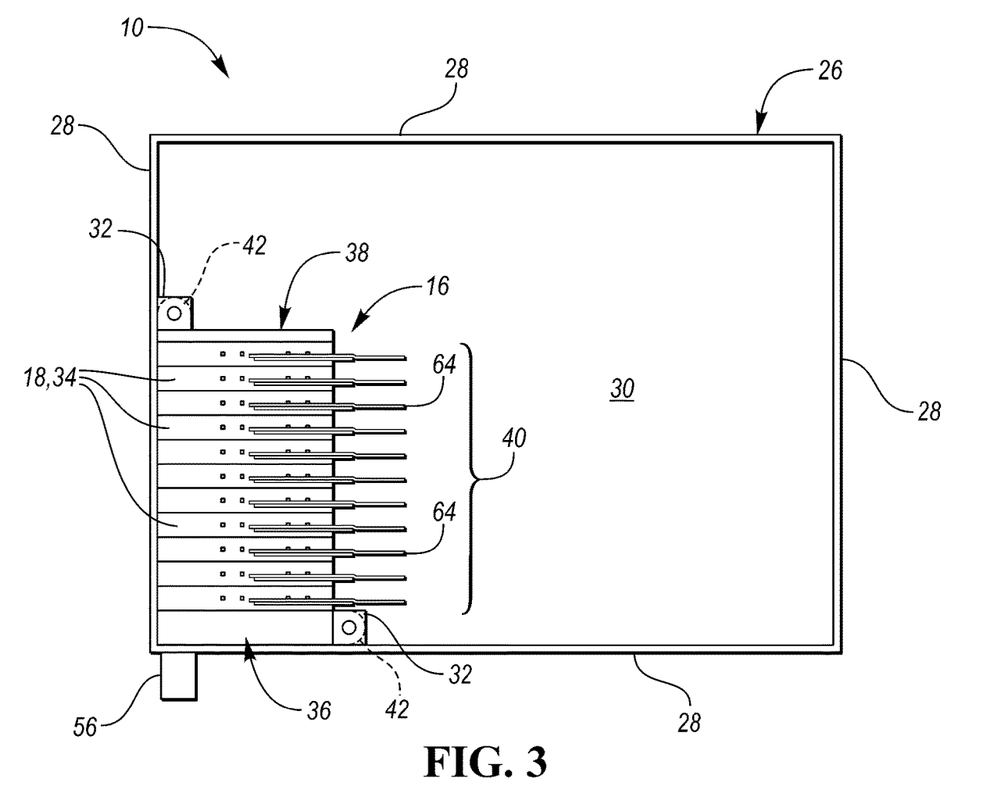
FIG. 3 is a top view of the first embodiment of the power supply device.
Figure 4:
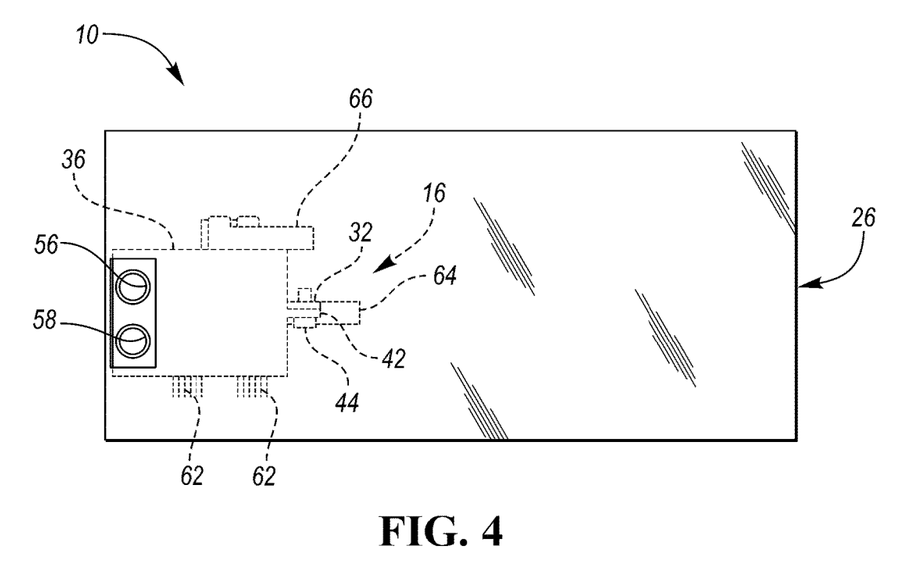
FIG. 4 is a front view of the first embodiment of the power supply device.

Referring to FIGS. 2-4, a first embodiment of a power supply device 10 is illustrated. The power supply device 10 includes a housing 26. The housing has a plurality walls 28 that form a periphery about and define an internal cavity 30. The plurality of walls 28 may be side walls of the housing that extend vertically from a bottom to a top of the housing 26. Adjacent walls of the plurality of walls 28 may be secured to each other at substantially perpendicular angles relative to each other. Substantially perpendicular may refer to any incremental value between 80° and 100°. Inwardly protruding tabs 32 may extend from internal surfaces of at least two of the walls 28 of the housing 26 and into the cavity 30. The inwardly protruding tabs 32 may also be referred to as inwardly extending protrusions. A first and a second of the inwardly protruding tabs 32 may extend into the cavity 30 from adjacent walls of the plurality of walls 28 such that the first and the second of the inwardly protruding tabs 32 extend into the cavity 30 in directions that are substantially perpendicular to each other. The inwardly protruding tabs 32 may integral to the housing 26. Alternatively, the inwardly protruding tabs 32 may be separate components that are secured to the internal surfaces of at least two of the walls 28 of the housing 26.

The switching units 18 of the power module 16 (or inverter assembly) may be disposed within external cases 34 that house the circuitry of the switching units. More specifically, each external case 34 may house a pair switching units 18 that, when connected to the power source 12, are arranged in series between positive and negative terminals of the power source 12. The power module 16 may include a front cover 36 and an end cover 38. The switching units 18, or more specifically the external cases 34 of the switching units 18, form an array 40 that is arranged and extends in a longitudinal direction 41 (or horizontally) between the front cover 36 and the end cover 38. The array 40 of switching units 18 may also be secured to both the front cover 36 and the end cover 38. Outwardly protruding tabs 42 may extend from the front cover 36 and the end cover 38. More specifically, a first of the outwardly protruding tabs 42 may extend from a side surface of the front cover 36 while a second of the outwardly protruding tabs 42 may extend from a front surface of the end cover 38. The outwardly protruding tabs 42 may also be referred to as outwardly extending protrusions. The outwardly protruding tabs 42 may integral to the front cover 36 and end cover 38. Alternatively, the outwardly protruding tabs 42 may be separate components that are secured to the front cover 36 and the end cover 38.

The power module 16 (or inverter assembly) may be disposed within the internal cavity 30 of the housing 26. The power module 16 may be secured to housing 26, or more specifically to the internal surfaces of at least two of the walls 28 of the housing 26, by a plurality of fasteners 44. Each of the plurality of fasteners 44 may extend substantially perpendicular to the longitudinal direction 41 (or vertically) and engage one of the inwardly protruding tabs 32 and one of the outwardly protruding tabs 42 to secure the power module 16 to the housing 26. More specifically, the outwardly protruding tabs 42 may define through holes 46, the inwardly protruding tabs 32 may define tapped holes 48, and each of the plurality of fasteners 44 may extend through one of the through holes 46 and engage (i.e., the fastener is threaded into) one of the tapped holes 48 to secure the power module 16 to the housing 26. Alternatively, the inwardly protruding tabs 32 may define the through holes while the outwardly protruding tabs 42 may define tapped holes.

An application excessive force to the array 40 in the longitudinal direction 41 (i.e., the direction in which the array 40 is arranged) may lead to over compression of the external cases 34, which in turn could result in damage to the circuitry of the switching units 18 disposed within the external cases 34. Orienting the fasteners 44 that are utilized for mounting the power module 16 to the housing 26 at an angle that is substantially perpendicular to the longitudinal direction 41 reduces or prevents any potential undesirable additional load that may be applied the array 40 in the longitudinal direction 41 when the power module 16 is mounted to the housing 26. Stresses may also be induced to the external housing from its external environment (e.g. vibrations from an engine of the vehicle, mechanical shocks when the vehicle goes over a big bump, etc.) The vibration may cause fatigue to the electrical connections and seal joints.

A cooling manifold 50 may be disposed within a series of aligned openings 52. Each aligned opening 52 is defined within one of the external cases 34 adjacent to the switching circuitry 54 of the switching units 18. The openings 52 may become aligned when the external cases 34 are arranged in the array 40 that extends horizontally between the front cover 36 and the end cover 38. A coolant or cooling liquid may be routed through the cooling manifold 50 in order to cool the switching units 18. Alternatively, the cooling manifold 50 may be omitted and the coolant or cooling liquid may be routed directly through the aligned openings 52 to cool the switching units 18.

The front cover 36 may include an inlet port 56 and an outlet port 58 that are configured to route the coolant or cooling liquid into and out of the cooling manifold 50 (or alternately the aligned openings 52), respectively, in order to transfer heat away from the switching units 18. One of the plurality of walls 28 of the housing may define an opening 60. The inlet port 56 and the outlet port 58 may each extend through the front cover 42 and through the opening 60 such that the inlet port 56 and the outlet port 58 extend beyond an exterior of the housing 26 and establish fluid communication with the cooling manifold 50 or aligned cooling openings 52.

The switching units 18 of the power module 16 include connectors 62 that protrude or extend from the external cases 34. The connectors 62 are configured to couple each switching unit 18 of the power module 16 to a controller (not shown). The controller may be a gate drive board that is configured to operate the transistors 20 of the switching units 18 of the power module 16 when delivering electrical power to the load 14, which includes converting DC electrical current into AC electrical current.

The switching units 18 of the power module 16 also include a first set of terminals 64 that are configured to couple each switching unit 18 to the load 14 and a second set of terminals 66 that are configured to couple each switching unit 18 to the power source 12. The second set of terminals 66 may also be configured to couple each switching unit 18 to the linking capacitor 24. The second set of terminals 66 may include positive and negative terminals. The positive and negative terminals of the second set of terminals 66 may be connected to positive and negative connections of a primary bus (not shown), which in turn connects the positive and negative terminals of the second set of terminals 66 to the power source 12 and the linking capacitor 24.

Figure 5:
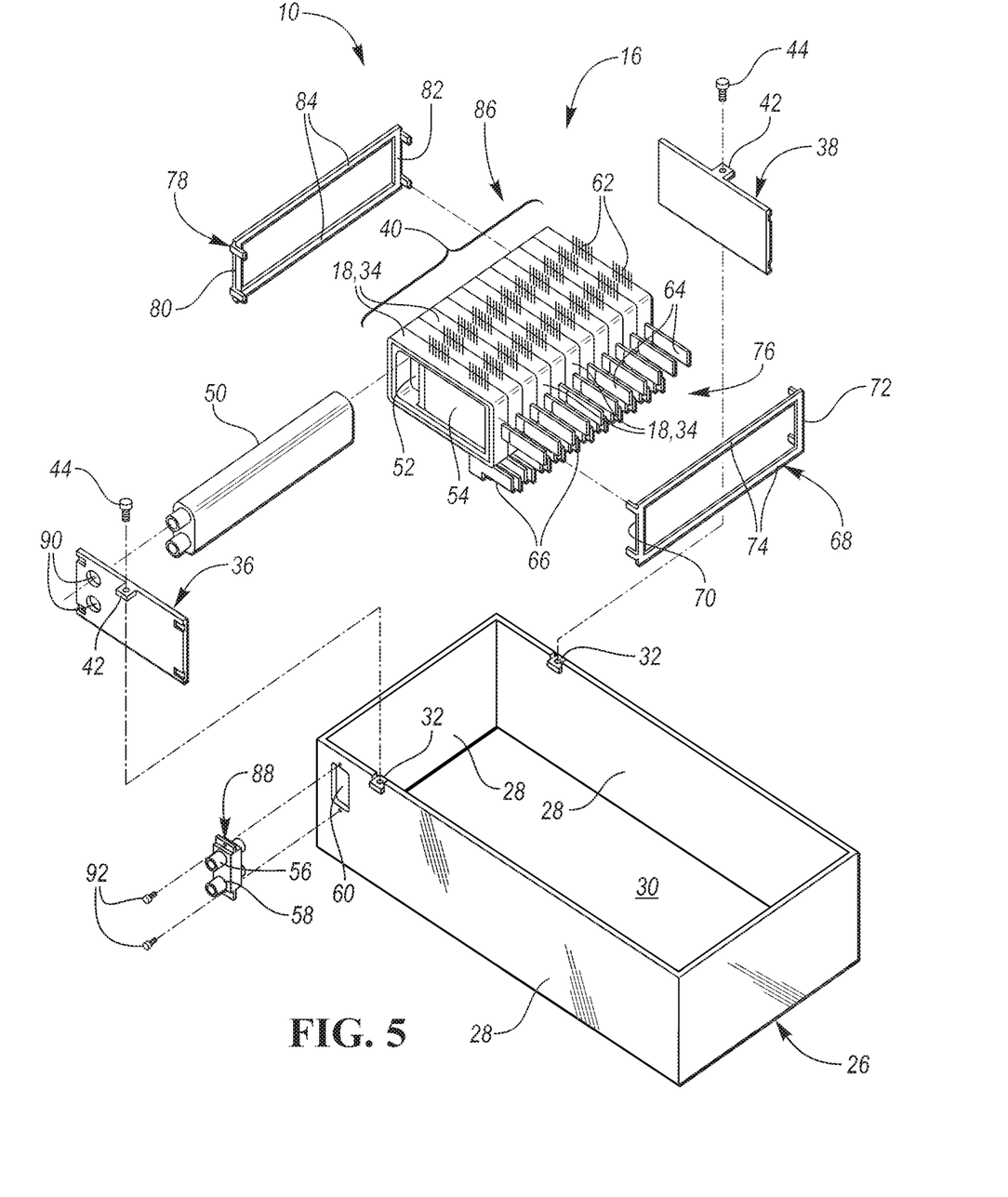
FIG. 5 is a top exploded isometric view of a second embodiment of the power supply device for the electric or hybrid vehicle.
Figure 6:
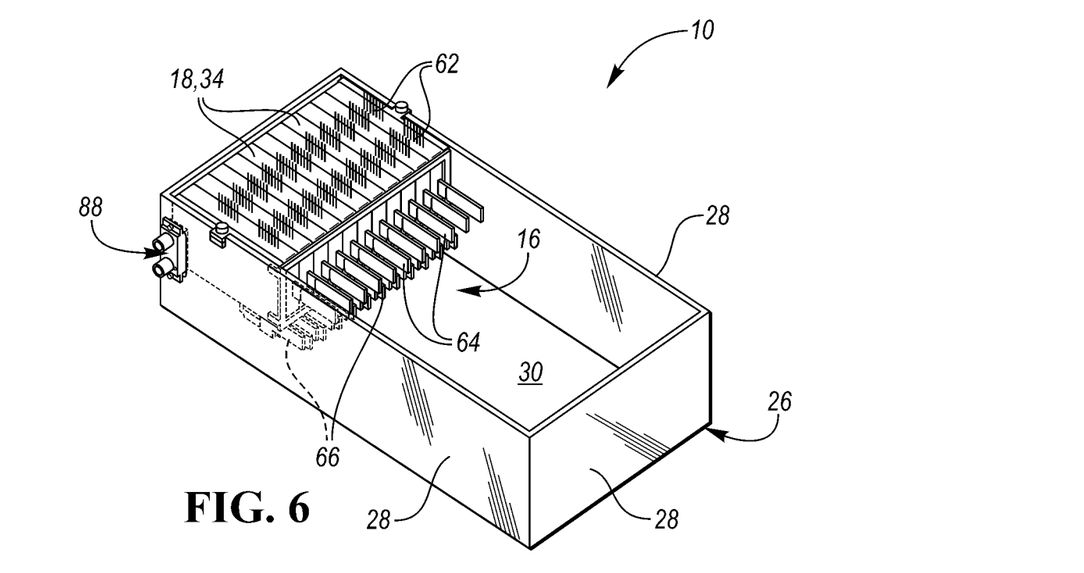
FIG. 6 is an isometric view of the second embodiment of the power supply device.
Figure 7:
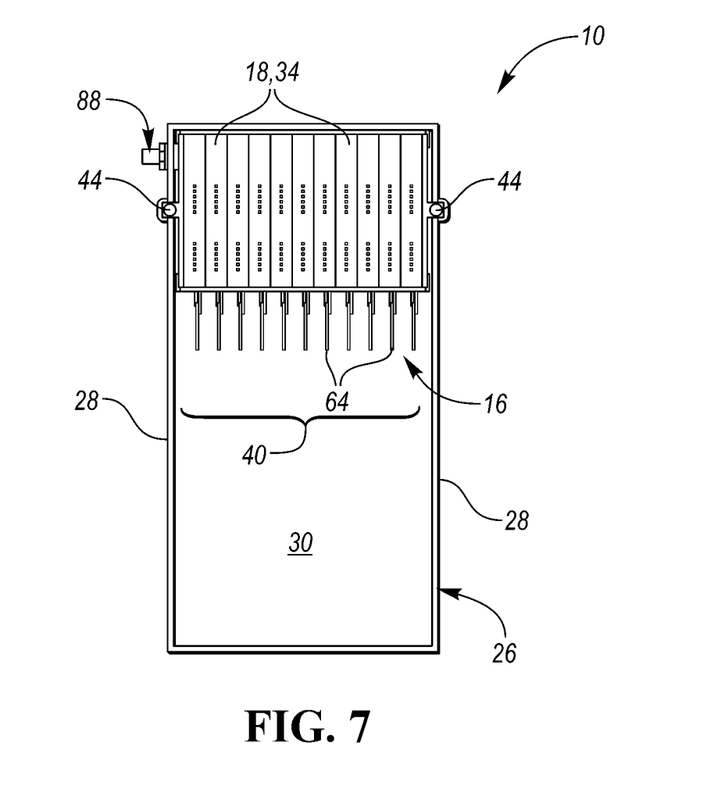
FIG. 7 is a top view of the second embodiment of the power supply device.

Referring to FIGS. 5-7, a second embodiment of the power supply device 10 is illustrated. The elements of the second embodiment of the power supply device 10 depicted in FIGS. 5-7 that are common to elements in FIGS. 2-4 will have the same structure and functionally as described with respect to FIGS. 2-4 unless otherwise stated herein.

In the second embodiment of the power supply device 10, a first and a second of the inwardly protruding tabs 32 may extend into the cavity 30 from opposing substantially parallel walls of the plurality of walls 28 of the housing 26 such that the first and the second of the inwardly protruding tabs 32 extend into the cavity 30 in opposite (or opposing) directions toward to each other. The protruding tabs 32 may also or alternatively extend perpendicularity outside of the housing wall, which reduces the volume of the cavity and benefits packaging. Substantially parallel may refer to any incremental value between plus and minus 10° from exactly parallel. Also in the second embodiment of the power supply device 10, a first of the outwardly protruding tabs 42 may extend from a front surface of the front cover 36 while a second of the outwardly protruding tabs 42 may extend from a front surface of the end cover 38.

The second embodiment of the power supply device 10 includes a first framework 68. The first framework 68 is secured to the front cover 36 and the end cover 38. More specifically, a first end 70 and a second end 72 of the first framework 68 may be secured the front cover 36 and the end cover 38, respectively. The first framework 68 has a first set of rails 74 that extends between the first end 70 and second end 72. The first set of rails 74 also extends between the front cover 36 and the end cover 38. The first set of rails 74 engages the external cases 34 of the switching units 18 along a first side 76 of the array 40 of switching units 18 in order to retain the external cases within the array 40 along the first side 76. The external cases 34 that house the switching units 18 may define grooves that retain the first set of rails 74 in order assist in maintaining alignment of the switching units 18 relative to the front cover 36 and end cover 38. The first set of rails 74 straddles the electrical terminals 64 that protrude from the external cases 34 along the first side 76 of the array 40.

The second embodiment of the power supply device 10 includes a second framework 78. The second framework 78 is secured to the front cover 36 and the end cover 38. More specifically, a first end 80 and a second end 82 of the second framework 78 may be secured the front cover 36 and the end cover 38, respectively. The second framework 78 has a second set of rails 84 that extends between the first end 80 and second end 82. The second set of rails 84 also extends between the front cover 36 and the end cover 38. The second set of rails 84 engages the external cases 34 of the switching units 18 along a second side 86 of the array 40 of switching units 18 in order to retain the external cases within the array 40 along the second side 86. The external cases 34 that house the switching units 18 may define additional grooves that retain the second set of rails 84 in order assist in maintaining alignment of the switching units 18 relative to the front cover 36 and end cover 38. The first embodiment of the power supply device 10 depicted in FIGS. 2-4 may also include the first framework 68 and second framework 78 to retain the external cases within the array 40 along the first and second sides of the array 40, respectively.

In the second embodiment, the power supply device 10 may also be constructed without the first framework 68 and without the second framework 78. In the absence of being constructed with the first framework 68 and the second framework 78, the power supply device 10 may be a single unit that is formed by gluing adjacent interfaces of the switching units 18 to each other and to the font cover 36 and end cover 38.

The second embodiment of the power supply device 10 includes a coolant port adaptor 88 that includes the inlet port 56 and the outlet port 58. The inlet port 56 and the outlet port 58 in the second embodiment are not integral to the front cover 42. Also in the second embodiment of the power supply device 10, the coolant port adaptor 88 is secured to an exterior surface of one of the plurality of wall 28 of the housing 26 such that the inlet port 56 and the outlet port 58 extend through the opening 60 defined by the wall 28 and through orifices 90 defined by the front cover 42 in order to establish fluid communication with the cooling manifold 50 or aligned cooling openings 52. More specifically, the coolant port adaptor 88 may secured to an exterior surface of one of the plurality of wall 28 of the housing 26 by a second plurality of fasteners 92.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric vehicle power supply configured to convert DC electrical power into AC electrical power comprising:
a housing having walls forming a periphery about and defining an internal cavity;
inwardly protruding tabs extending from the walls and into the cavity;
a power assembly having front and end covers, and an array of electrical switching units secured to and arranged in a longitudinal direction between the front and end covers, wherein each of the switching units have an external case that houses switching circuitry, and wherein the power assembly further comprises a first framework secured to each of the front and end covers, the first framework having a first set of rails that extend between the front and end covers, engage the external cases along a first side of the array of switching units, and straddle electrical terminals that protrude from the external cases;
outwardly protruding tabs extending from each of the front and end covers; and
a plurality of fasteners, each extending perpendicular to the longitudinal direction and engaging one inwardly protruding tab and one outwardly protruding tab to secure the power assembly to the walls.

2. The vehicle power supply of claim 1, wherein the power assembly further comprises a second framework secured to each of the front and end covers, the second framework having a second set of rails that extend between the front and end covers and engage the external cases along a second side of the array of switching units opposite the first side of the array of switching units.

3. The vehicle power supply of claim 1 further comprising a cooling manifold, an inlet port, and an outlet port, wherein the cooling manifold is disposed within aligned openings defined within each external case adjacent to the switching circuitry, and wherein the inlet and outlet ports extend through the front cover and through an orifice defined by one of the walls of the housing to establish fluid communication with the cooling manifold.

4. The vehicle power supply of claim 3, wherein the inlet and the outlet ports are secured to one of the walls of the housing via a second plurality of fasteners.

5. The vehicle power supply of claim 1, wherein the inwardly protruding tabs define through holes and the outwardly protruding tabs define tapped holes, and wherein each of the plurality of fasteners extend through one of the through holes and are threaded into one of the tapped holes to secure the power assembly to the walls.

6. An electric vehicle power supply comprising:
a housing defining an internal cavity and having inwardly protruding tabs extending into the cavity;
a power assembly having front and end covers and an array of electrical switching units arranged horizontally therebetween, the covers having outwardly protruding tabs, wherein each of the switching units have an external case that houses switching circuitry, and wherein the power assembly further comprises a first framework secured to each of the front and end covers, the first framework having a first set of rails that extend between the front and end covers, engage the external cases along a first side of the array of switching units, and straddle electrical terminals that protrude from the external cases; and
a plurality of fasteners, each extending vertically and engaging one inwardly protruding tab and one outwardly protruding tab to secure the power assembly to the housing.

7. The vehicle power supply of claim 6, wherein the power assembly further comprises a second framework secured to each of the front and end covers, the second framework having a second set of rails that extend between the front and end covers and engage the external cases along a second side of the array of switching units opposite the first side of the array of switching units.

8. The vehicle power supply of claim 6 further comprising a cooling manifold, an inlet port, and an outlet port, wherein the cooling manifold is disposed within aligned openings defined within each external case adjacent to the switching circuitry, and wherein the inlet and outlet ports extend through the front cover and through an orifice defined by the housing to establish fluid communication with the cooling manifold.

9. The vehicle power supply of claim 6, wherein the inwardly protruding tabs define through holes and the outwardly protruding tabs define tapped holes, and wherein each of the plurality of fasteners extend through one of the through holes and are threaded into one of the tapped holes to secure the power assembly to the housing.

10. The vehicle power supply of claim 6, wherein a first and a second of the inwardly protruding tabs extend into the cavity in opposing directions, respectively.

11. The vehicle power supply of claim 6, wherein a first and a second of the inwardly extending protrusions extend into the cavity in substantially perpendicular directions relative to each other.

12. A vehicle power supply comprising:
a housing having inwardly extending protrusions that define through holes;
an inverter assembly disposed in the housing and having an array of electrical switching units arranged horizontally between front and end covers, each cover having an outwardly extending protrusion that defines a tapped hole, wherein each of the switching units have an external case that houses switching circuitry, and wherein the inverter assembly further comprises a first framework secured to each of the front and end covers, the first framework having a first set of rails that extend between the front and end covers, engage the external cases along a first side of the array of switching units, and straddle electrical terminals that protrude from the external cases; and
a plurality of fasteners, each extending vertically through one through hole and engaging one tapped hole to secure the inverter assembly to the housing.

13. The vehicle power supply of claim 12, wherein a first and a second of the inwardly protruding tabs extend into a cavity defined by the housing in opposing directions, respectively.

14. The vehicle power supply of claim 12, wherein a first and a second of the inwardly extending protrusions extend into the cavity in substantially perpendicular directions relative to each other.

15. The vehicle power supply of claim 3 further comprising a coolant port adapter that is secured an exterior surface of one of the walls of the housing, wherein the coolant port adapter includes the inlet and outlet ports.

16. The vehicle power supply of claim 15, wherein the coolant port adapter is secured to the exterior surface one of the walls of the housing via a second plurality of fasteners.

17. The vehicle power supply of claim 8 further comprising a coolant port adapter that is secured an exterior surface of the housing, wherein the coolant port adapter includes the inlet and outlet ports.

18. The vehicle power supply of claim 17, wherein the coolant port adapter is secured to the exterior surface one of the walls of the housing via a second plurality of fasteners.

19. The vehicle power supply of claim 12 further comprising a cooling manifold, an inlet port, and an outlet port, wherein the cooling manifold is disposed within aligned openings defined within each external case adjacent to the switching circuitry, and wherein the inlet and outlet ports extend through the front cover and through an orifice defined by the housing to establish fluid communication with the cooling manifold.

20. The vehicle power supply of claim 19 further comprising a coolant port adapter that is secured an exterior surface of the housing, wherein the coolant port adapter includes the inlet and outlet ports.

* * * * *